(12) United States Patent
Nakada

(10) Patent No.: US 12,548,143 B2
(45) Date of Patent: Feb. 10, 2026

(54) IMAGE PROCESSING APPARATUS, IMAGE PROCESSING METHOD, AND COMPUTER-READABLE MEDIUM THAT INSPECT A PRINT PRODUCT BASED ON FIRST AND SECOND DOCUMENT IMAGES

(71) Applicant: CANON KABUSHIKI KAISHA, Tokyo (JP)

(72) Inventor: Yuichi Nakada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 249 days.

(21) Appl. No.: 18/303,665

(22) Filed: Apr. 20, 2023

(65) Prior Publication Data
US 2023/0351584 A1    Nov. 2, 2023

(30) Foreign Application Priority Data

Apr. 28, 2022 (JP) .................................. 2022-075363

(51) Int. Cl.
*G06T 7/00* (2017.01)
*G06V 10/25* (2022.01)
*G06V 10/74* (2022.01)

(52) U.S. Cl.
CPC .............. *G06T 7/001* (2013.01); *G06V 10/25* (2022.01); *G06V 10/761* (2022.01); *G06T 2207/30144* (2013.01)

(58) Field of Classification Search
None
See application file for complete search history.

(56) References Cited

U.S. PATENT DOCUMENTS

| 2015/0078627 A1* | 3/2015 | Fukase | G06T 7/001 |
| | | | 382/112 |
| 2020/0058115 A1* | 2/2020 | Mimura | H04N 1/00005 |
| 2022/0044373 A1* | 2/2022 | Taylor | G06T 5/50 |

FOREIGN PATENT DOCUMENTS

| JP | 2000132662 A | 5/2000 |
| JP | 2013-186562 A | 9/2013 |

(Continued)

OTHER PUBLICATIONS

Extended European Search Report issued Jun. 20, 2023, in counterpart European Application No. 23165444.3 (9 pages).

(Continued)

*Primary Examiner* — Leon Viet Q Nguyen
(74) *Attorney, Agent, or Firm* — Venable LLP

(57) ABSTRACT

An image processing apparatus obtains first information indicating a local displacement between a first document image and a first read image obtained by reading a print product based on the first document image, generates a reference image obtained by adding the local displacement in accordance with the first information to a second document image and compares a second read image with the reference image to inspect a print product based on the second document image, the second read image obtained by reading the print product based on the second document image. The reference image includes a document region obtained by adding local deformation in accordance with the first information to the second document image, and a blank region surrounding the document region. An image inside the document region is obtained by adding the local deformation regarding the first information to the second document image and deforming the addition result.

19 Claims, 13 Drawing Sheets

(56) References Cited

FOREIGN PATENT DOCUMENTS

| | | |
|---|---|---|
| JP | 2015065647 A | 4/2015 |
| JP | 2015130658 A | 7/2015 |

OTHER PUBLICATIONS

Japanese Office Action issued Mar. 25, 2024, in corresponding Japanese Patent Application No. 2022-075363, with English translation (10 pages).
European Office Action issued Nov. 19, 2025, in Corresponding European Application No. 23165444.3 (6 pages).

\* cited by examiner

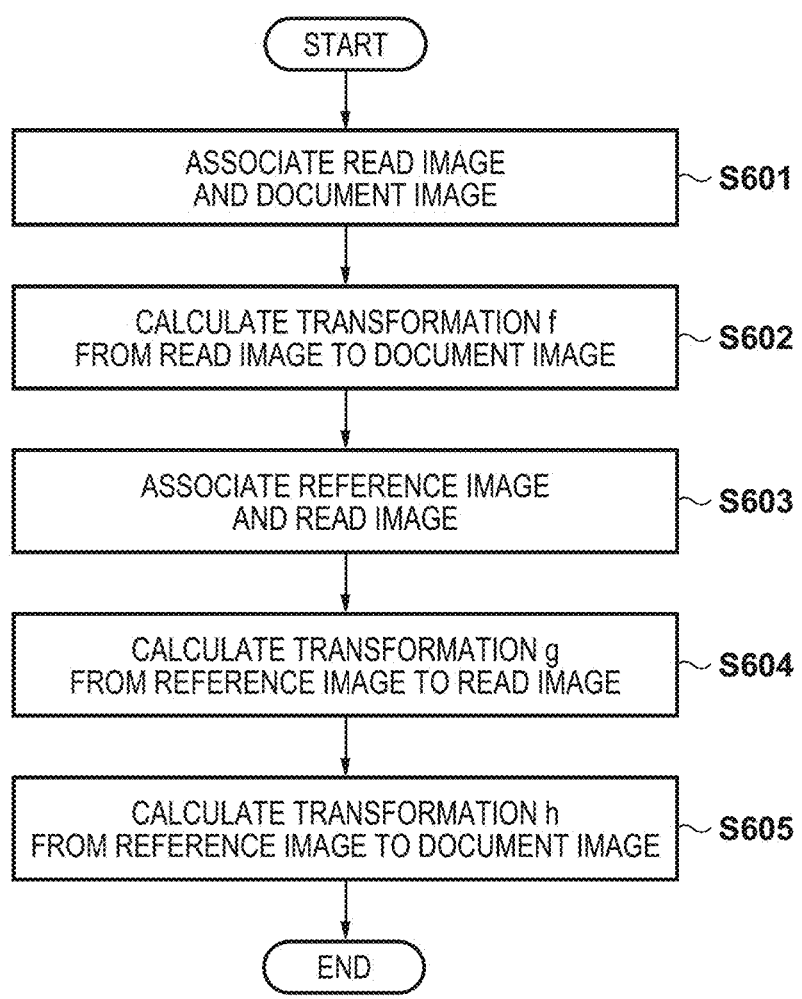

$(x'', y'') = h(x,y) = f(g(x,y))$

FIG. 12
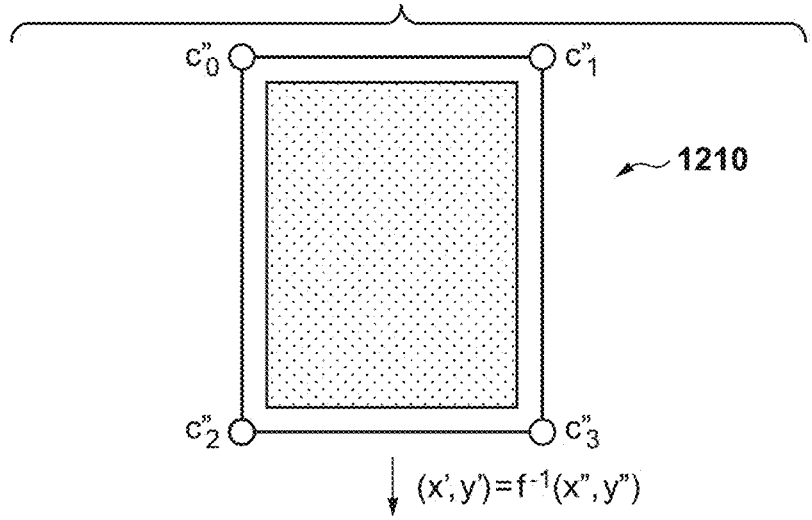
$(x', y') = f^{-1}(x'', y'')$
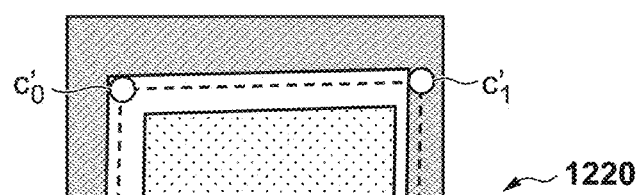
$(x', y') = g(x, y)$
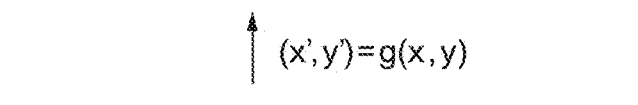

IMAGE PROCESSING APPARATUS, IMAGE PROCESSING METHOD, AND COMPUTER-READABLE MEDIUM THAT INSPECT A PRINT PRODUCT BASED ON FIRST AND SECOND DOCUMENT IMAGES

CROSS-REFERENCE TO PRIORITY APPLICATION

This application claims the benefit of Japanese Patent Application No. 2022-075363, filed Apr. 28, 2022, which is hereby incorporated by reference herein in its entirety.

BACKGROUND OF THE INVENTION

Field of the Invention

The present invention relates to an image processing apparatus, an image processing method, and a computer-readable medium, and, in particular, to a technique to inspect a print product.

Description of the Related Art

There is a case when a print product output from a printing apparatus includes a stain caused by a color material, such as ink and toner, attaching to an unintended location. Alternatively, there is a case when, a sufficient color material does not attach to a location where an image is supposed to be formed, thereby causing a color loss, meaning that a color becomes lighter than the color originally is. A defect in a print product, such as the aforementioned stain and color loss, reduces the quality of the print product. In view of this, a defect in a print product is inspected in order to guarantee the quality of the print product. As a visual inspection of whether there is a defect requires a significant cost, inspection systems that automatically perform an inspection have been developed.

These inspection systems can determine whether there is a defect based on, for example, a difference between a reference image used as a pre-registered inspection reference for a print product and an inspection target image obtained by reading a print product to be inspected. Japanese Patent Laid-Open No. 2013-186562 suggests a technique where, considering that a reference image generated from printed image data does not completely match an inspection target image, position alignment is performed with respect to the reference image and the inspection target image in order to compare them with each other. Specifically, according to the method of Japanese Patent Laid-Open No. 2013-186562, an entire image is divided into a plurality of blocks, and first position alignment is performed in a plurality of regions in an image periphery portion. In this way, the displacement amounts of the respective blocks are calculated. Thereafter, position alignment is performed with respect to the blocks of the inspection target image, which have been shifted in accordance with the displacement amounts of the respective blocks, and the blocks of the reference image while further shifting them minutely.

SUMMARY OF THE INVENTION

According to an embodiment of the present invention, an image processing apparatus comprises one or more memories storing instructions and one or more processors that execute the instructions to obtain first information indicating a local displacement between a first document image and a first read image that is obtained by reading a print product based on the first document image, to generate a reference image, the reference image being obtained by adding the local displacement in accordance with the first information to a second document image and to compare a second read image and the reference image with each other to perform an inspection of a print product based on the second document image, the second read image being obtained by reading the print product based on the second document image.

According to another embodiment of the present invention, an image processing method comprises obtaining first information indicating a local displacement between a first document image and a first read image that is obtained by reading a print product based on the first document image, generating a reference image, the reference image being obtained by adding the local displacement in accordance with the first information to a second document image, and comparing a second read image and the reference image with each other to perform an inspection of a print product based on the second document image, the second read image being obtained by reading the print product based on the second document image.

According to still another embodiment of the present invention, a non-transitory computer-readable medium stores a program executable by a computer to perform a method comprising obtaining first information indicating a local displacement between a first document image and a first read image that is obtained by reading a print product based on the first document image, generating a reference image, the reference image being obtained by adding the local displacement in accordance with the first information to a second document image, and comparing a second read image and the reference image with each other to perform an inspection of a print product based on the second document image, the second read image being obtained by reading the print product based on the second document image.

Further features of the present invention will become apparent from the following description of exemplary embodiments (with reference to the attached drawings).

BRIEF DESCRIPTION OF THE DRAWINGS

FIG. 6 is a flowchart showing the details of processing for obtaining deformation information.

FIG. 12 is a diagram showing an overview of association between a reference image and a read image.

DESCRIPTION OF THE EMBODIMENTS

Figure 1:
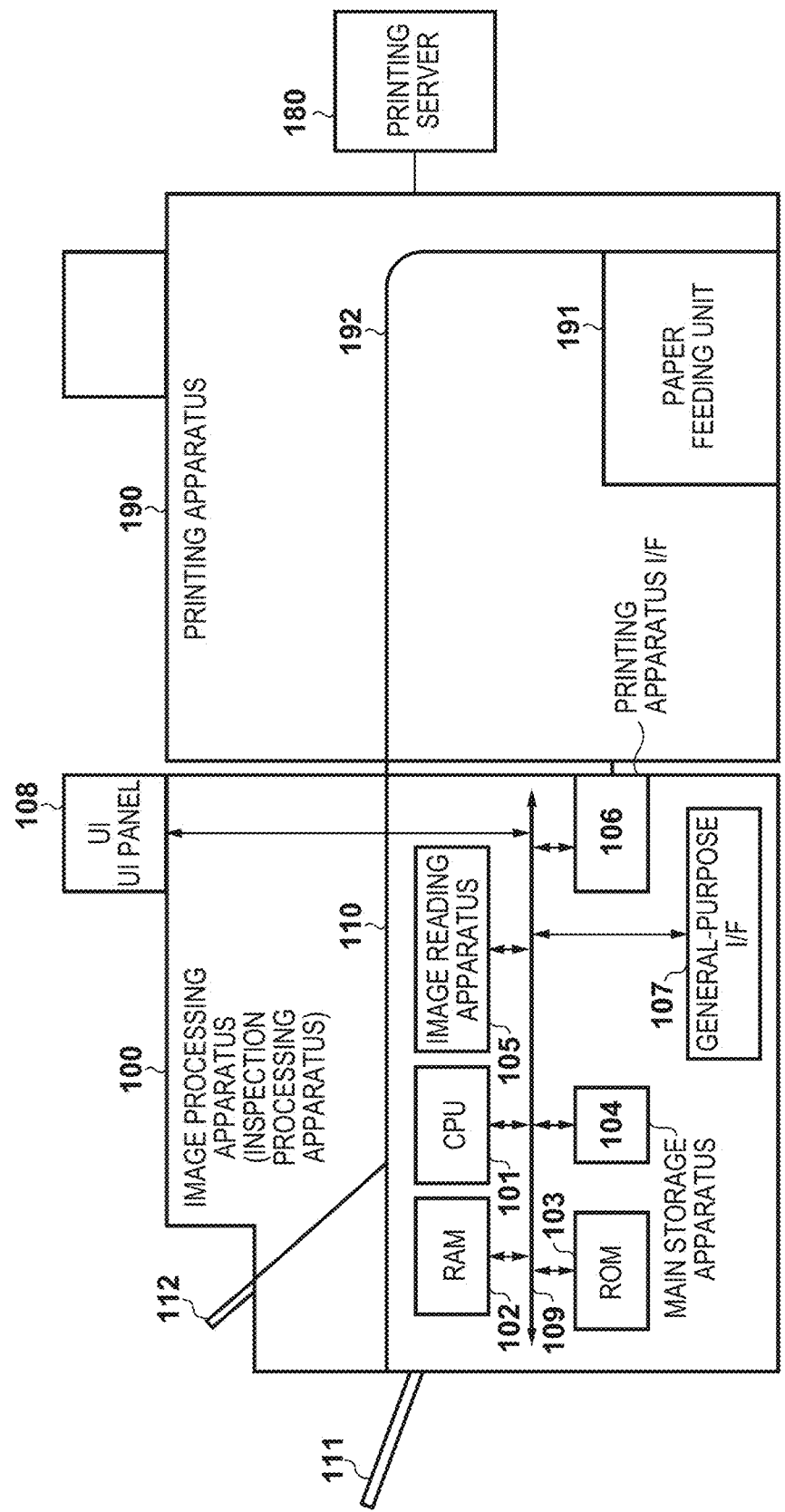
FIG. 1 is a diagram showing a configuration of a printing system according to an embodiment.

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and a redundant description thereof is omitted.

According to the technique disclosed in Japanese Patent Laid-Open No. 2013-186562, in a case when a local displacement between a reference image and an inspection target image is great, sufficient position alignment cannot be performed with respect to blocks, which may reduce the inspection accuracy. Furthermore, according to Japanese Patent Laid-Open No. 2013-186562, as the foregoing position alignment is performed for each print product to be inspected, increasing the range in which blocks are shifted during the position alignment of blocks may reduce the inspection speed.

An embodiment of the present invention can increase the accuracy of an inspection of a print product that includes comparing the result of reading of the print product based on a document image with the document image.

An image processing apparatus according to an embodiment of the present invention obtains deformation information indicating a relationship between a first document image (hereafter referred to as a calibration document image) and a first read image (hereafter referred to as a calibration read image) obtained by reading a print product based on the first document image. This image processing apparatus further generates a reference image by deforming a second document image (hereafter referred to as a document image to be inspected, or simply a document image) in accordance with the deformation information. Then, based on a comparison between a second read image (hereafter referred to as an inspection target image), which is obtained by reading a print product based on the second document image (hereafter referred to as a print product to be inspected), and the reference image, this image processing apparatus inspects this print product. By thus deforming the document image using the deformation information, the reference image, to which a local displacement (also called local deformation) caused by printing or reading has been given, can be generated.

<Configuration of Printing System>

FIG. 1 shows an exemplary configuration of an entirety of a printing system that includes an image processing apparatus 100 according to an embodiment of the present invention, and that outputs and inspects a print product. The printing system according to the present embodiment includes the image processing apparatus 100, a printing server 180, and a printing apparatus 190. The printing server 180 generates a print job for printing a print document (a normal print job) and a print job for printing a calibration print document (a calibration print job), and inputs these print jobs to the printing apparatus 190. Hereafter, such electronic data may be referred to as print data. Based on a print job input from the printing server 180, the printing apparatus 190 forms an image on a recording medium (e.g., paper). In the present example, a printing sheet is used as the recording medium. The printing apparatus 190 includes a paper feeding unit 191, and a user can set the printing sheet in the paper feeding unit in advance. Once a print job has been input, the printing apparatus 190 conveys the printing sheet set in the paper feeding unit 191 along a conveyance path 192, forms an image corresponding to the print job on a front side, or both sides, of the printing sheet during the conveyance, and sends the printing sheet to the image processing apparatus 100. While the printing apparatus 190 according to the embodiment to be described below is a printing apparatus of an electrophotographic method, a printing method is not limited in particular, and the printing apparatus 190 may be a printing apparatus of an offset printing method or an ink-jet method.

The image processing apparatus 100 according to an embodiment of the present invention inspects a print product. In the present example, the image processing apparatus 100 performs inspection processing for checking whether there is an abnormality with respect to the printing sheet on which the image has been formed by the printing apparatus 190 and that has been sent via the conveyance path 192, that is to say, the print product. As such, the image processing apparatus 100 functions as an inspection processing apparatus.

The image processing apparatus 100 includes a CPU 101, a RAM 102, a ROM 103, a main storage apparatus 104, and an image reading apparatus 105. The image processing apparatus 100 further includes a printing apparatus interface (I/F) 106, a general-purpose interface (I/F) 107, a user interface (UI) panel 108, and a main bus 109. The image processing apparatus 100 further includes a conveyance path 110 for a print product, which is connected to the conveyance path 192 of the printing apparatus 190, an output tray 111 that discharges a print product for which an abnormality has not been found and that has passed the inspection, and an output tray 112 that discharges a print product for which an abnormality has been found and that has failed the inspection. Note that the image processing apparatus 100 may be configured to sort a print product in a more detailed manner, in addition to sorting the print product into two types: a print product that has passed, and a print product that has failed. Moreover, the main storage apparatus 104, the image reading apparatus 105, the UI panel 108, the conveyance path 110, the output tray 111, and the output tray 112 may be provided outside the image processing apparatus 100 in the printing system. For example, the image processing apparatus 100 may control an operation for conveyance of a print product on the conveyance path 110 by obtaining a read image from the image reading apparatus 105 and performing processing shown in FIG. 3.

The CPU 101 is a processor, and can integrally control components inside the image processing apparatus 100. The RAM 102 can function as a main memory, a working area, or the like for the CPU 101. The ROM 103 stores a group of programs executed by the CPU 101. The main storage apparatus 104 stores an application executed by the CPU 101, data used in image processing, and so forth. The function of each component shown in, for example, later-described FIG. 2 can be realized by the processor such as the CPU 101 executing programs stored in such memories as the RAM 102, the ROM 103, and the main storage apparatus 104.

The image reading apparatus (scanner) 105 can read one side or both sides of the print product sent from the printing apparatus 190 on the conveyance path 110, and obtain the result of reading as image data (print image). The printing apparatus I/F 106 is connected to the printing apparatus 190. The printing apparatus I/F 106 is used for communication with the printing apparatus 190. For example, the image processing apparatus 100 can receive, via the printing apparatus I/F 106, information related to the print product sent from the printing apparatus 190 (including a print job, a document image (or image data used in printing), sheet size information, and so forth). Furthermore, the image processing apparatus 100 can synchronize timings of processing of the print product with the printing apparatus 190, and mutually communicate therewith about a working status, via the printing apparatus I/F 106.

The general-purpose I/F 107 is an interface for connecting to an external apparatus. The general-purpose I/F 107 is, for example, a serial bus interface, such as a USB and IEEE 1394, and can be used when the user takes out data, such as logs. The UI panel 108 is a user interface of the image processing apparatus 100. The UI panel 108 is, for example, a liquid crystal display, and can display the current status or settings of the image processing apparatus 100 to inform the user of the same. Furthermore, the UI panel 108 can include a display or buttons of a touch-panel method, and can accept a user instruction (e.g., an instruction related to an inspection or calibration) via these input apparatuses. Note that such input apparatuses as a mouse and a keyboard may be provided separately from the UI panel 108. The main bus 109 is a transmission line that connects components of the image processing apparatus 100.

While conveying a print product to be inspected sent from the printing apparatus 190 on the conveyance path 110, the image processing apparatus 100 performs inspection processing, which is to be described below, based on image data of the print product to be inspected read by the image reading apparatus 105 (an inspection target image). If the print product passes the inspection (that is to say, if the print product satisfies a predetermined quality standard), the print product is conveyed to the output tray 111. Otherwise, the print product is conveyed to the output tray 112. In this way, only print products that have been confirmed to satisfy the quality standard can be collected on the output tray 111 as print products to be delivered.

<Functional Configuration of Image Processing Apparatus>

Figure 2:
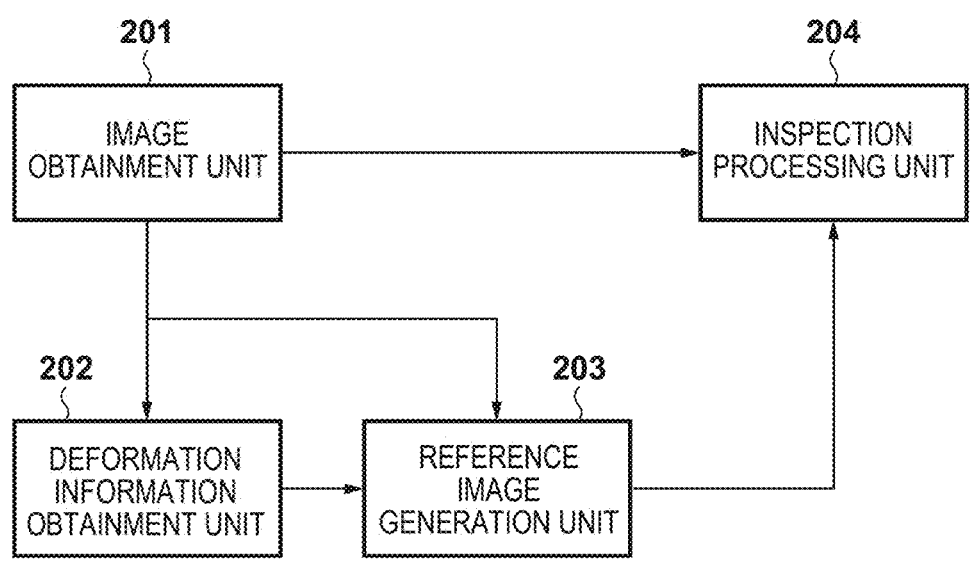
FIG. 2 is a block diagram showing an exemplary functional configuration of an image processing apparatus according to an embodiment.

FIG. 2 shows a functional configuration of the image processing apparatus 100 according to the present embodiment. While the functions of the image processing apparatus 100 shown in FIG. 2 can be realized by a computer including a processor and a memory as described above, a part or all of the functions included in the image processing apparatus 100 may be realized by dedicated hardware. Furthermore, the image processing apparatus according to an embodiment of the present invention may be composed of, for example, a plurality of information processing apparatuses connected via a network.

The image processing apparatus 100 includes an image obtainment unit 201, a deformation information obtainment unit 202, a reference image generation unit 203, and an inspection processing unit 204.

The image obtainment unit 201 obtains a document image and a read image. The document image can be obtained from the printing apparatus I/F 106, and the read image can be obtained as a result of the image reading apparatus 105 reading a print product on the conveyance path 110. In the foregoing manner, the image obtainment unit 201 can obtain a calibration document image and a calibration read image. The calibration read image is a document image corresponding to a calibration print job, and the calibration read image is the result of reading of a print product based on the calibration document image. This print product is obtained as a result of the printing apparatus 190 performing printing based on the calibration document image on a medium. Furthermore, in the foregoing manner, the image obtainment unit 201 can obtain a document image to be inspected and an inspection target image. The document image to be inspected is a document image corresponding to a print job to be inspected, and the inspection target image is the result of reading of a print product to be inspected based on the document image to be inspected. The print product to be inspected is obtained as a result of the printing apparatus 190 performing printing based on the document image to be inspected on a medium. The image obtainment unit 201 can hold image data obtained in the foregoing manner in the RAM 102 or the main storage apparatus 104.

The deformation information obtainment unit 202 obtains deformation information indicating a local displacement between the calibration document image and the calibration read image. The deformation information obtainment unit 202 can obtain such deformation information, which indicates a deformation caused by printing and/or reading of a print product, based on the calibration document image and the calibration read image.

The reference image generation unit 203 generates a reference image, which is obtained by adding the local displacement corresponding to the deformation information to the document image to be inspected. Based on the deformation information, the reference image generation unit 203 can give the local displacement caused by printing and/or reading of a print product to the document image to be inspected. This reference image is image data that is used as a reference in an inspection of a print product.

The inspection processing unit 204 compares the inspection target image with the reference image in order to inspect a print product based on the document image to be inspected. The inspection processing unit 204 can perform the inspection processing and output an inspection result by comparing the read image corresponding to the print product to be inspected (the inspection target image) with the reference image in the foregoing manner.

<Processing Executed by Image Processing Apparatus>

Figure 3:
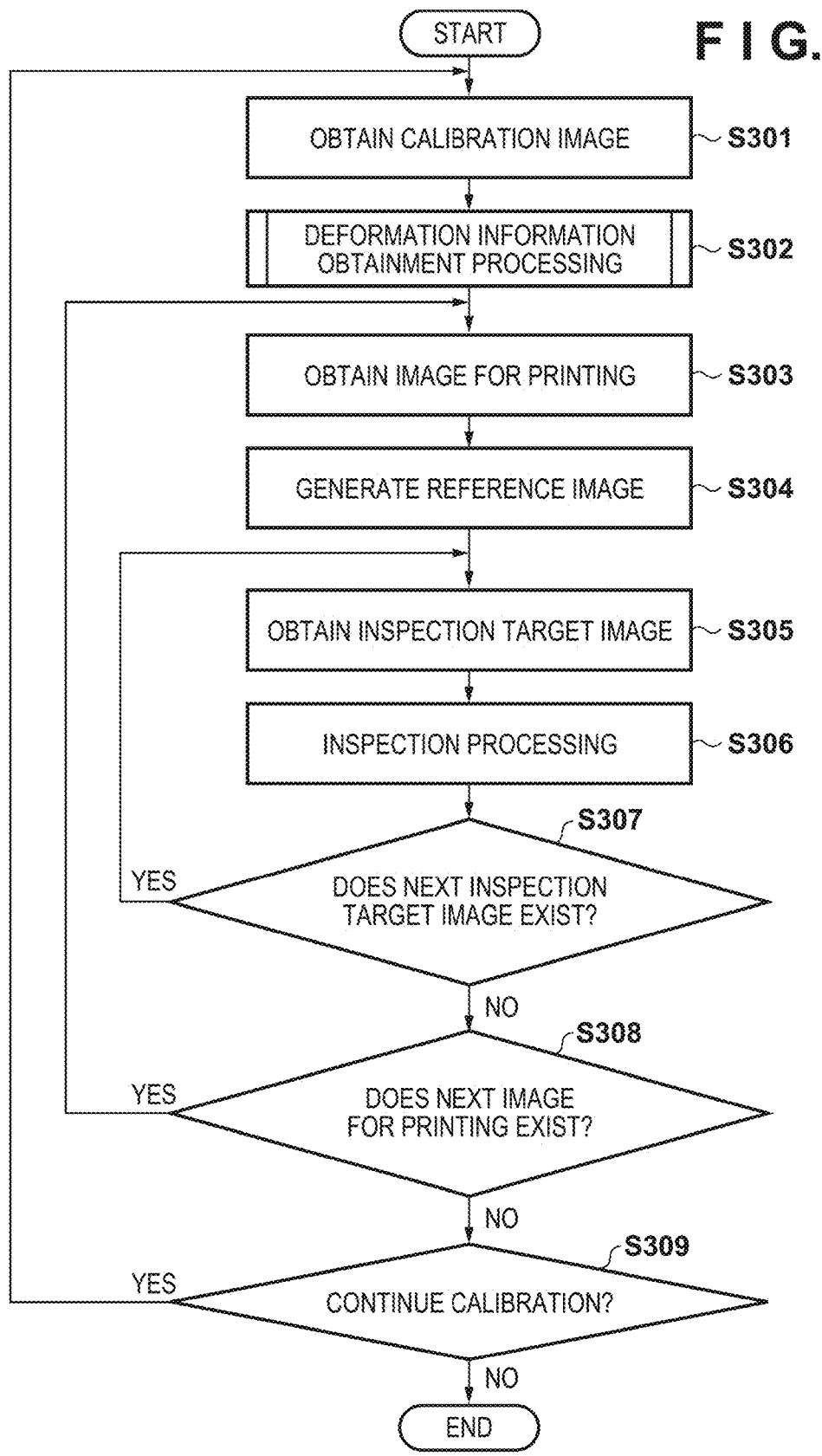
FIG. 3 is a flowchart of an image processing method according to an embodiment.

FIG. 3 is a flowchart showing an example of an image processing method implemented by the image processing apparatus 100. Hereafter, each step (process) is denoted by a reference sign starting with S.

Figure 4A:
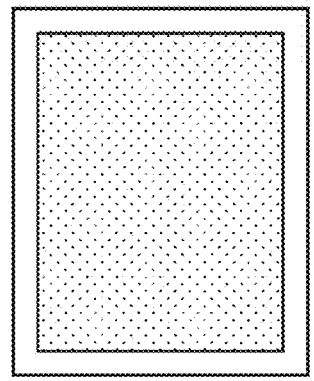
FIGS. 4A to 4F are diagrams showing examples of a document image, a read image, and a reference image.
Figure 4B:
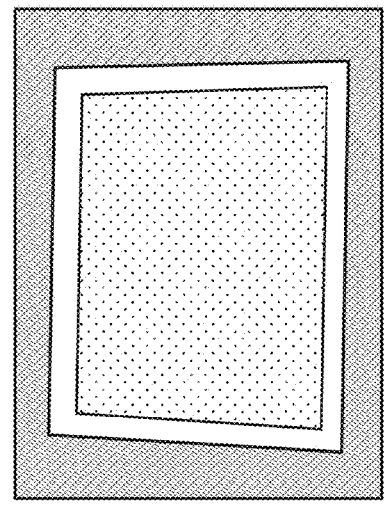

In step S301, the image obtainment unit 201 obtains a calibration document image and a calibration read image. An example of the calibration document image is shown in FIG. 4A, and an example of the calibration read image is shown in FIG. 4B. The calibration document image corresponds to an entirety of a printing sheet, and represents a print pattern relative to the entirety of the printing sheet. The calibration document image used in the present embodiment is image data in which a random pattern is arranged in a region that can be printed by the printing apparatus 190, and is held in the image processing apparatus 100 in advance. It should be noted that no specific restriction is placed on the type of the calibration document image. For example, the calibration document image may include a characteristic object that facilitates matching between the calibration document image and the calibration read image. The calibration read image is an image obtained by reading a print product obtained by printing that has been performed by the printing apparatus 190 based on the calibration document image, and includes a local displacement caused by printing and/or reading.

In step S302, the deformation information obtainment unit 202 obtains deformation information. In the present embodiment, the deformation information obtainment unit 202 generates the deformation information based on the calibration document image and the calibration read image. In the present embodiment, the deformation information is denoted by a transformation f from a read image into a document image, which is indicated by expression (1).

$$(x'', y'') = f(x', y')$$
$$(x', y') = g(x, y)$$
$$(x'', y'') = h(x, y)$$
(1)

In expression (1), (x', y') denotes coordinates on the read image, and (x", y") denotes coordinates on the document image. This transformation f indicates the coordinates on the document image that respectively correspond to the coordinates on the read image, and can indicate a local displacement of an object on the read image from the document image.

In the present embodiment, the deformation information obtainment unit 202 further obtains a transformation h from a reference image into the document image, which is indicated in expression (1). In expression (1), (x,y) denotes coordinates on the reference image. The deformation information obtainment unit 202 further obtains a transformation g from the reference image into the read image, which is indicated in expression (1), and obtains a transformation h based on the transformation f and the transformation g. The transformation h indicates the coordinates on the document image that respectively correspond to the coordinates on the reference image, and can be used in transforming the document image into the reference image. The details of the foregoing processing will be described later.

Figure 4C:
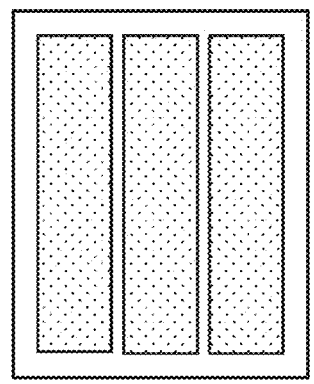

In step S303, the image obtainment unit 201 obtains a document image to be inspected. An example of the document image is shown in FIG. 4C. The document image corresponds to an entirety of a printing sheet, and represents a print pattern relative to the entirety of the printing sheet.

Figure 4D:
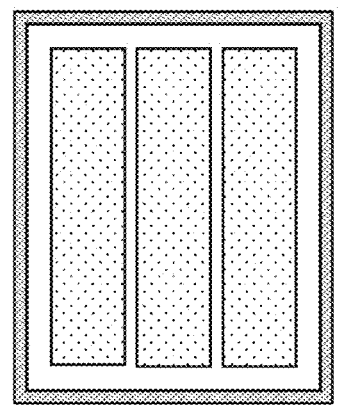

In step S304, the reference image generation unit 203 generates a reference image based on the deformation information and the document image. An example of the reference image is shown in FIG. 4D. In the present embodiment, the reference image generation unit 203 generates the reference image obtained by adding the local displacement corresponding to the deformation information to the document image to be inspected. Through this processing, the reference image is obtained, which is an image obtained by giving the local displacement caused by printing and/or reading to the document image. Note that, in the present embodiment, a medium size (e.g., a sheet size) corresponding to the document image to be inspected is the same as a medium size (e.g., a sheet size) corresponding to the calibration document image.

In the present embodiment, the reference image includes a document region and a background region. Although an image edge portion may be deformed by adding the local displacement to the document image, providing the background region in the reference image in the foregoing manner makes it easy to perform an inspection on the image edge portion. In the present embodiment, the reference image has a predetermined resolution, and the size (e.g., width) of the background region is set in advance. Furthermore, the shape of the document region may correspond to the shape of a printing medium on which printing based on the document image to be inspected is performed. For example, the size of the document region can be set so that it matches the medium size corresponding to the document image. The reference image used in the present embodiment includes, in the document region, an image obtained by adding the local displacement corresponding to the deformation information to the document image to be inspected, and by further applying deformation in accordance with the document region. As will be described later, in order to apply deformation in accordance with the document region, uniform deformation of the entirety of the image, such as projective transformation, can be performed. An image inside the document region obtained through the foregoing deformation still indicates the result of adding the local displacement corresponding to the deformation information to the document image to be inspected.

In the present embodiment, the reference image generation unit 203 deforms the document image into the reference image using the aforementioned transformation h. Although the details will be described later, in the deformation using the transformation h, the local displacement corresponding to the deformation information can be added, and the result of the addition can further be deformed in accordance with the shape of the document region. The deformation information obtainment unit 202 can obtain the transformation h in consideration of the resolution and the document region of such a reference image. In accordance with expression (1), the reference image generation unit 203 calculates coordinates (xi ", yi") on the document image that correspond to a pixel i in the reference image, from coordinates (xi, yi) on the reference image that correspond to the pixel i in the reference image. Then, with regard to all pixels in the reference image, the reference image generation unit 203 calculates corresponding coordinates on the document image based on the transformation h, and calculates pixel values of the calculated coordinates by way of interpolation using pixel values of nearby pixels in the document image.

Figure 4E:
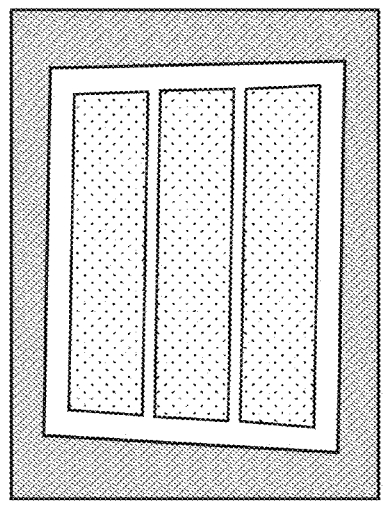
Figure 4F:
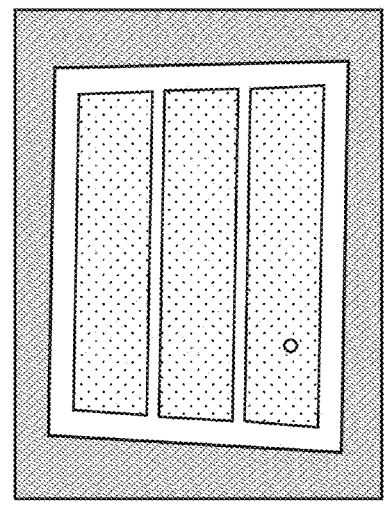

In step S305, the image obtainment unit 201 obtains an inspection target image. An example of an inspection target image that does not include a stain is shown in FIG. 4E, and an example of an inspection target image that includes a stain is shown in FIG. 4F.

In step S306, the inspection processing unit 204 inspects a print product to be inspected based on a comparison between the inspection target image and the reference image. At this time, the inspection processing unit 204 can deform at least one of the inspection target image and the reference image before the comparison. For example, the inspection processing unit 204 can deform at least one of the inspection target image and the reference image so as to perform position alignment with respect to an object on the reference image and an object on the inspection target image. Through this deformation, position alignment can be performed with respect to the inspection target image and the reference image so that the overall shapes of the inspection target image and the reference image match each other. The position alignment performed here can include not only translational position alignment, but also uniform transformation of the entirety of the image, such as projective transformation. For example, at least one of the inspection target image and the reference image may be deformed using a transformation that indicates a relationship between predeformation coordinates and post-deformation coordinates using a shared parameter set for the entire region.

Figure 5A:
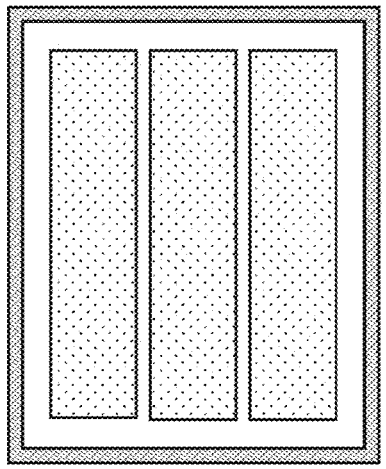
FIGS. 5A to 5D are diagrams showing examples of a deformed inspection target image and a difference image.
Figure 5B:
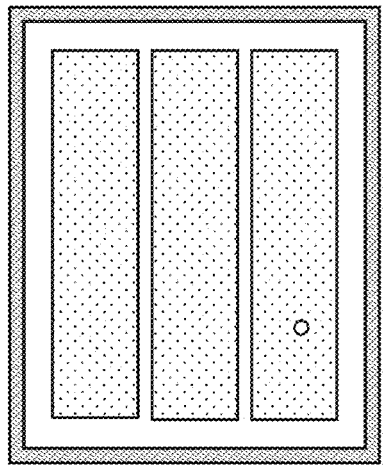

In the present embodiment, the inspection processing unit 204 first deforms the inspection target image in accordance with the reference image. For example, the inspection processing unit 204 can apply projective transformation to the inspection target image based on the correspondence among characteristic points on the reference image and the inspection target image (e.g., four position alignment marks provided near the vertices of an image). An example of the result of deformation of an inspection target image that does not include a defect is shown in FIG. 5A, and an example of the result of deformation of an inspection target image that includes a defect is shown in FIG. 5B.

Figure 5C:
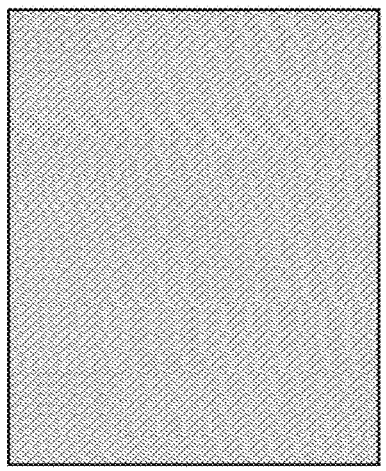
Figure 5D:
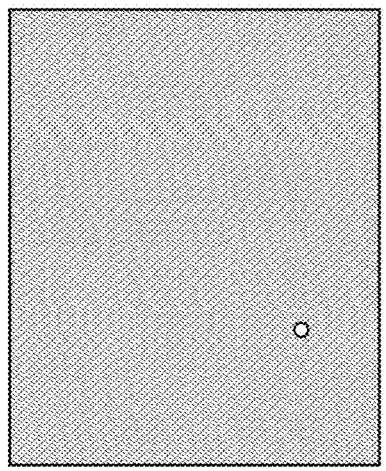

Then, the inspection processing unit 204 generates a difference image that includes, as pixel values, the differences in color information between corresponding pixels in the deformed inspection target image and the reference image. An example of a difference image corresponding to an inspection target image that does not include a defect is shown in FIG. 5C, and an example of a difference image corresponding to an inspection target image that includes a defect is shown in FIG. 5D. For example, the absolute values of the luminance differences calculated from pixel values can be used as the differences, among others. Then, the inspection processing unit 204 compares a threshold that has been set based on an inspection sensitivity with the pixel values of the difference image, and generates a defect map that indicates pixels with pixel values equal to or greater than the threshold as defective pixels. The inspection processing unit 204 can determine that the print product has passed the inspection in a case when the defect map does not indicate the existence of defective pixels, and determine that the print product has failed the inspection in a case when the defect map indicates the existence of defective pixels. The method of determining the inspection result is not limited to the foregoing method. For example, the inspection processing unit 204 may determine that the print product has failed the inspection in a case when the proportion of the number of abnormal pixels to the total number of pixels in the reference image is equal to or greater than a predetermined value.

The inspection processing unit 204 can output such a printing result. The inspection result output from the inspection processing unit 204 can be used for, for example, processing for switching a discharge destination of the print product between the output tray 111 and the output tray 112.

In step S307, the inspection processing unit 204 determines whether the next inspection target image exists. In a case when the next inspection target image exists, processing proceeds to step S305. In a case when the next inspection target image does not exist, processing proceeds to step S308.

In step S308, the inspection processing unit 204 determines whether the next document image exists. In a case when the next document image exists, processing proceeds to step S303. In a case when the next document image does not exist, processing proceeds to step S309.

In step S309, the inspection processing unit 204 determines whether to continue the inspection or calibration based on, for example, a user instruction obtained via the UI panel 108. In a case when the inspection or calibration is to be continued, processing proceeds to step S301. In a case when the inspection or calibration is not to be continued, processing ends.

<Deformation Information Obtainment Processing>

FIG. 6 is a flowchart showing the details of processing in which the deformation information obtainment unit 202 obtains the deformation information in step S302. In the present processing, first, the deformation information obtainment unit 202 calculates the above-described transformation f based on the calibration document image and the calibration read image. Thereafter, the deformation information obtainment unit 202 calculates the transformation g from the reference image into the read image based on reference points set in the reference image and the read image. Finally, the deformation information obtainment unit 202 calculates the transformation h from the reference image into the document image based on the transformation f and the transformation g.

In step S601, the deformation information obtainment unit 202 associates the calibration read image and the calibration document image with each other. The deformation information obtainment unit 202 can obtain information indicating the association between points on the calibration document image and corresponding points on the calibration read image.

Figure 7B:
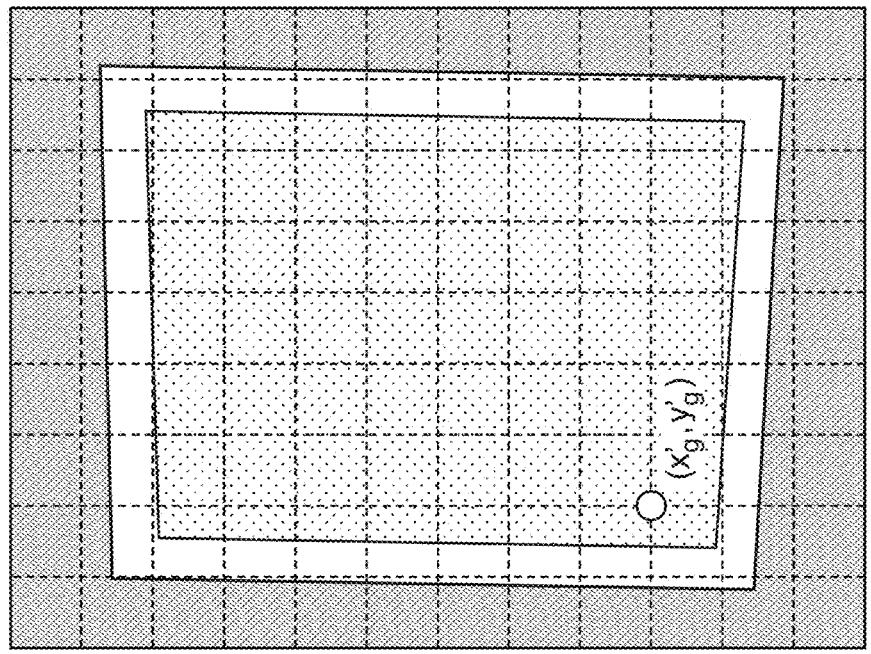
FIGS. 7A and 7B are diagrams showing an overview of association between a read image and a document image.
Figure 7A:
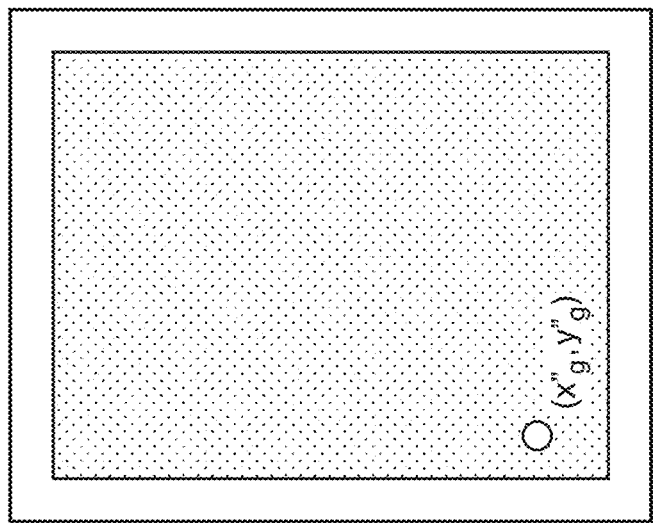

FIGS. 7A and 7B show an overview of the association between the read image and the document image. In the present embodiment, the deformation information obtainment unit 202 first places grid points at a predetermined interval in the calibration read image. Then, the deformation information obtainment unit 202 determines points on the calibration document image that respectively correspond to the grid points. Specifically, the deformation information obtainment unit 202 can determine that a point on the calibration document image that has an image feature similar to an image feature present at a grid point on the calibration read image is a point corresponding to the grid point.

For example, the deformation information obtainment unit 202 can use a region around a grid point on the calibration read image as a template, and perform matching between the template and the calibration document image. This matching makes it possible to detect a partial region of the calibration document image that has a high degree of coincidence with the template. Through this matching, the deformation information obtainment unit 202 can determine coordinates (x"g, y"g) on the calibration document image shown in FIG. 7A, which correspond to coordinates (x'g, y'g) of a grid point on the calibration read image shown in FIG. 7B.

In step S602, the deformation information obtainment unit 202 calculates the transformation f from the read image into the document image based on the coordinates of the grid points that were associated in step S601.

Figure 8:
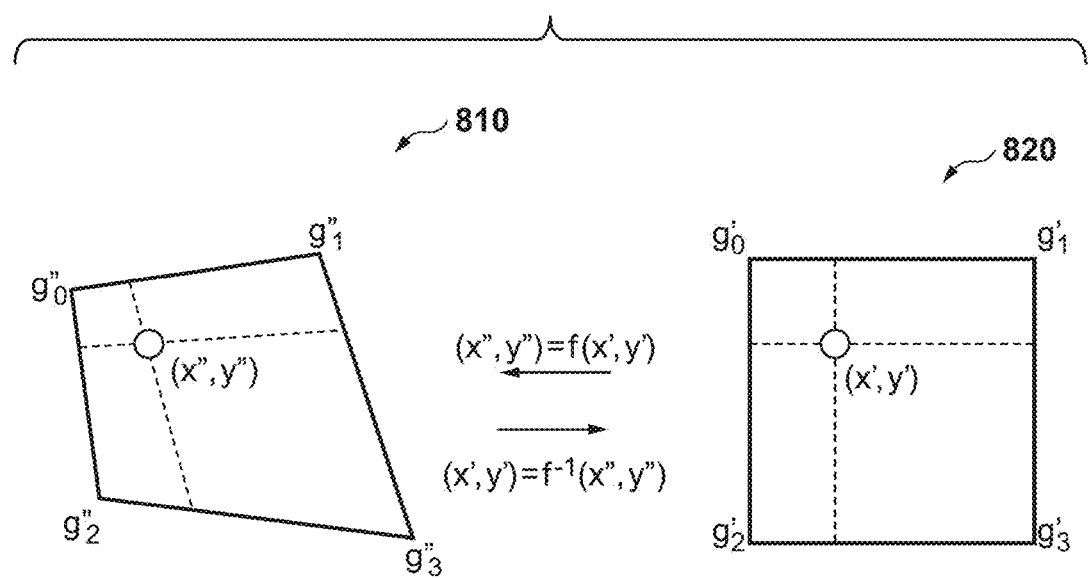
FIG. 8 is a diagram showing an overview of a transformation from a read image into a document image.

FIG. 8 shows an overview of the transformation from the read image into the document image. In the present embodiment, the transformation f is a quasi-affine transformation based on the association of grid points. The transformation f for transforming the coordinates (x', y') on a read image 820 into the coordinates (x", y") on a document image 810 can be indicated by expression (2).

$$(x'', y'') = f(x', y') \qquad (2)$$

$$x'' = u(x''_{g_1} - x''_{g_0}) + v(x''_{g_2} - x''_{g_0}) + uv(x''_{g_3} - x''_{g_2} - x''_{g_1} + x''_{g_0}) + x''_{g_0}$$

$$y'' = u(y''_{g_1} - y''_{g_0}) + v(y''_{g_2} - y''_{g_0}) + uv(y''_{g_3} - y''_{g_2} - y''_{g_1} + y''_{g_0}) + y''_{g_0}$$

-continued $$u = \frac{x' - x'_{g0}}{x'_{g1} - x'_{g0}}$$

$$v = \frac{y' - y'_{g0}}{y'_{g2} - y'_{g0}}$$

In expression (2), $(x'_{g0}, y'_{g0})$, $(x'_{g1}, y'_{g1})$, $(x'_{g2}, y'_{g2})$, and $(x'_{g3}, y'_{g3})$ respectively denote the coordinates of four grid points g'0, g'1, g'2, and g'3 near the coordinates (x', y') on the read image. Furthermore, $(x''_{g0}, y''_{g0})$, $(x''_{g1}, y''_{g1})$, $(x''_{g2}, y''_{g2})$, and $(x''_{g3}, y''_{g3})$ respectively denote the coordinates of the points g"0, g"1, g"2, and g"3 on the document image that respectively correspond to the grid points g'0, g'1, g'2, and g'3.

In other words, the transformation f indicates the relationship between the coordinates of a point on the calibration document image and the coordinates of the corresponding point on the calibration read image based on the association between points located near the point on the calibration document image (e.g., grid points) and corresponding points on the calibration read image. Furthermore, the relationship between the coordinates of points on the calibration document image included in one of a plurality of regions and the coordinates of corresponding points on the calibration read image can be indicated using parameter sets that are respectively set for the regions. In the aforementioned example, the regions that have been separated using the grid points correspond to the plurality of regions, and the coordinates of g"0, g"1, g"2, and g"3 correspond to the parameter sets.

Also, the deformation information obtainment unit 202 further calculates a transformation $f^{-1}$ from the document image into the read image. The transformation $f^{-1}$ for transforming the coordinates (x", y") on the read image into the coordinates (x', y') on the document image can be indicated by expression (3).

$$(x', y') = f^{-1}(x'', y'') \qquad (3)$$

$$x' = u(x'_{g1} - x'_{g0}) + x'_{g0}$$

$$y' = v(y'_{g2} - y'_{g0}) + y'_{g0}$$

$$u = \frac{\left(\begin{array}{c} x'' - x''_{g0} \\ y'' - x''_{g0} \end{array}\right) \times \left(\begin{array}{c} x''_{g3} - x''_{g2} - x''_{g1} + x''_{g0} \\ y''_{g3} - y''_{g2} - y''_{g1} + y''_{g0} \end{array}\right)}{\left(\begin{array}{c} x''_{g1} - x''_{g0} \\ y''_{g1} - y''_{g0} \end{array}\right) \times \left(\begin{array}{c} x''_{g3} - x''_{g2} - x''_{g1} + x''_{g0} \\ y''_{g3} - y''_{g2} - y''_{g1} + y''_{g0} \end{array}\right)}$$

$$y = \frac{\left(\begin{array}{c} x'' - x''_{g0} \\ y'' - x''_{g0} \end{array}\right) \times \left(\begin{array}{c} x''_{g3} - x''_{g2} - x''_{g1} + x''_{g0} \\ y''_{g3} - y''_{g2} - y''_{g1} + y''_{g0} \end{array}\right)}{\left(\begin{array}{c} x''_{g2} - x''_{g0} \\ y''_{g2} - y''_{g0} \end{array}\right) \times \left(\begin{array}{c} x''_{g3} - x''_{g2} - x''_{g1} + x''_{g0} \\ y''_{g3} - y''_{g2} - y''_{g1} + y''_{g0} \end{array}\right)}$$

The information obtained in step S601, which indicates the association between the calibration read image and the calibration document image, can be used as deformation information that indicates a local displacement between the calibration read image and the calibration document image. Furthermore, the transformations f and $f^{-1}$ obtained in step S602, too, can be used as deformation information that indicates a local displacement between the calibration read image and the calibration document image. For the above-described association based on image features, these pieces of deformation information indicate the association between a target point and a corresponding point whereby an object located at a target point on the calibration document image matches an object located at a corresponding point on the calibration read image. Note that, in the present embodiment, the transformation f is used as the deformation information. Meanwhile, in the present embodiment, the reference image obtained by adding local deformation corresponding to the deformation information to the document image to be inspected and, by further applying deformation thereto, is used for an inspection of a print product. In steps S603 to S606, the transformation h used in transforming the document image to be inspected into the reference image is calculated using the deformation information.

Figure 9:
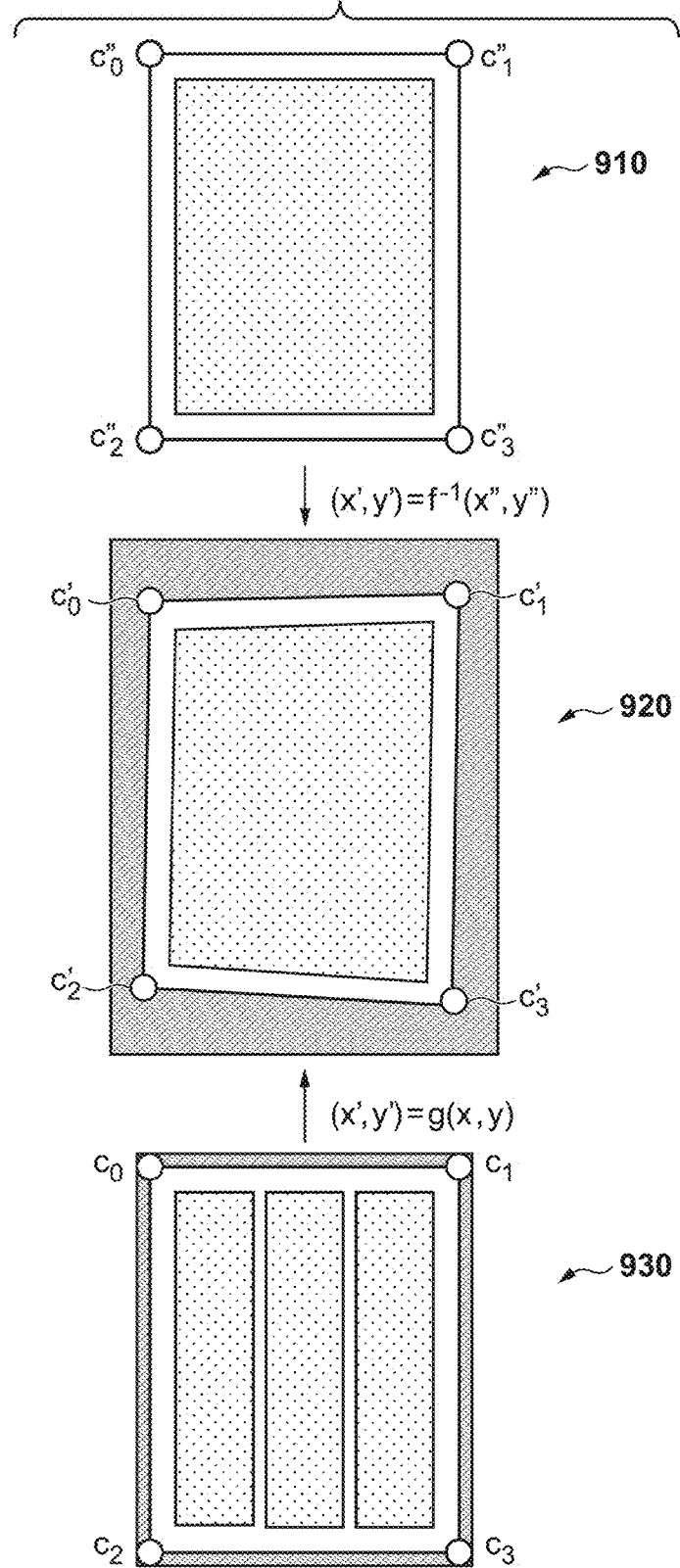
FIG. 9 is a diagram showing an overview of association between a reference image and a read image.

In step S603, the deformation information obtainment unit 202 associates the reference image and the read image with each other. FIG. 9 shows an overview of the association between the reference image and the read image. In the present embodiment, the deformation information obtainment unit 202 associates reference points on the reference image with reference points on the read image. Here, for example, the vertices of a rectangular printing sheet, which is a medium, can be used as the reference points.

In the present embodiment, the reference points on the reference image are the vertices of the printing sheet in the reference image, that is to say, the vertices of the document region. As stated earlier, in the present embodiment, the resolution of the reference image and the size of the background region are set in advance. The deformation information obtainment unit 202 can calculate the coordinates of reference points c0, c1, c2, and c3 corresponding to the vertices of the printing sheet in a reference image 930 based on the resolution of the reference image, the size of the background region, and the medium size corresponding to the document image.

In the present embodiment, the reference points on the read image are equivalent to the vertices of the printing sheet shown in the read image. In the present embodiment, the deformation information obtainment unit 202 calculates the coordinates of the reference points on the read image using the transformation $f^{-1}$. For example, the deformation information obtainment unit 202 can calculate the coordinates of reference points c"0, c"1, c"2, and c"3 corresponding to the vertices of the printing sheet in a document image 910. Specifically, the coordinates of four corners of the document image can be used as the coordinates of reference points on the document image. Then, using the transformation $f^{-1}$, the deformation information obtainment unit 202 can calculate the coordinates corresponding to the reference points c'0, c'1, c'2, and c'3 on a read image 920 from the coordinates of the reference points c"0, c"1, c"2, and c"3. Finally, the deformation information obtainment unit 202 associates the reference points c0, c1, c2, and c3 on the reference image 930 with the reference points c'0, c'1, c'2, and c'3 on the read image 920.

In step S604, the deformation information obtainment unit 202 calculates the transformation g from the reference image into the read image based on the association made between the reference image and the read image in step S603. In the present embodiment, the transformation g from the reference image into the read image is projective transformation based on correspondence between the reference points on the reference image and the reference points on the read image. For example, the transformation g for transforming coordinates (x,y) on the reference image 930 into coordinates (x', y') on the read image 920 can be indicated by expression (4).

$$(x', y') = g(x, y) \quad (4)$$

$$x' = \frac{a_0 x + a_1 y + a_2}{a_6 x + a_7 y + a_8}$$

$$y' = \frac{a_3 x + a_4 y + a_5}{a_6 x + a_7 y + a_8}$$

In expression (4), $a_0$ to as denote projective transformation parameters. The projective transformation parameters can be calculated using the method of least squares based on the association between the reference points on the reference image and the reference points on the read image.

Figure 10:
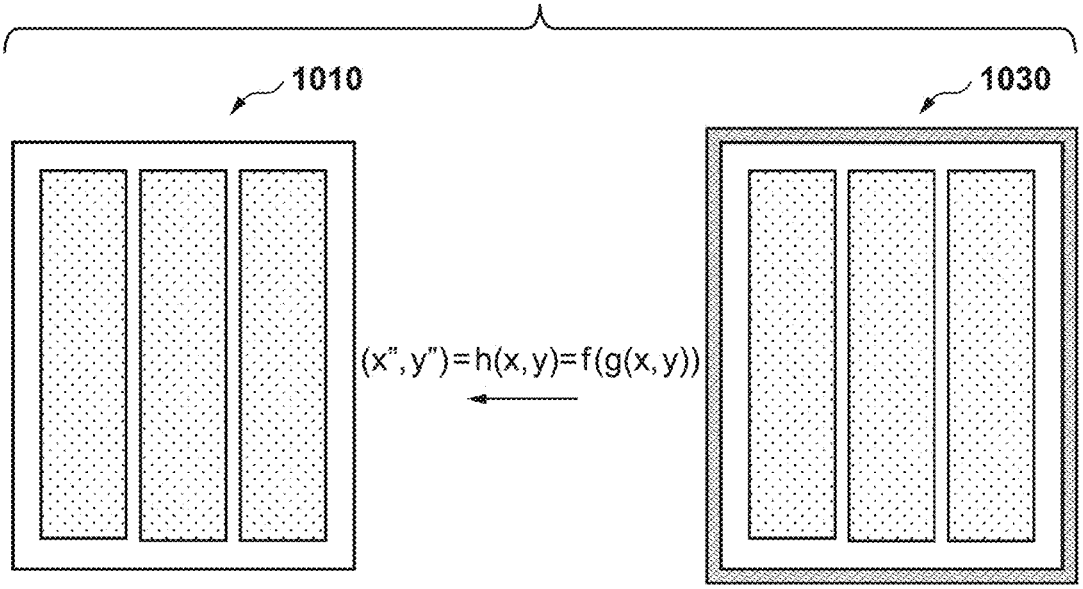
FIG. 10 is a diagram showing an overview of a transformation from a reference image into a document image.

In step S605, the deformation information obtainment unit 202 calculates the transformation h from the reference image into the document image. FIG. 10 shows an overview of the transformation from the reference image into the document image. The transformation h for calculating coordinates (x", y") on a document image 1010 from coordinates (x,y) on a reference image 1030 can be indicated by expression (5) based on the transformation f from the read image into the document image, and on the transformation g from the reference image into the read image.

$$(x", y")=h(x,y)=f(g(x,y))\ldots \quad (5)$$

According to the present embodiment described above, an inspection can be performed on a print product to be inspected using a document image to be inspected. Specifically, the inspection is performed based on a comparison between the result of adding a local displacement to the document image to be inspected and an inspection target image, which is the result of reading of the print product to be inspected. According to such an embodiment, the inspection can be performed with high accuracy even in a case when an image in a print product or a read image has been locally deformed compared to a document image, in addition to a case when the position of a print product shown in the inspection target image has been shifted overall. For example, there is a possibility that a minute local deformation is shared among print products or read images due to, for example, minute variations in the medium conveyance speed during printing and/or reading performed by the printing apparatus 190 and/or the image processing apparatus 100. Although such a minute local deformation may barely affect the quality, it has a possibility of affecting the inspection result. By using a reference image to which a local displacement has been added for the inspection as in the present embodiment, however, the inspection accuracy can be increased. Furthermore, while local position alignment is performed with respect to the calibration document image and the calibration read image at the time of obtainment of the deformation information in the present embodiment, it is not essential to perform local position alignment when performing an inspection on each of a plurality of print products. Therefore, an increase in the inspection speed is also expected.

<Modification Examples>

In the above-described embodiment, an image that has been held in advance is used as the calibration document image. However, another document image may be used as the calibration document image. For example, a document image to be inspected, which is used later for an inspection purpose, may be used as the calibration document image. That is to say, the calibration document image and the document image to be inspected may be the same. On the other hand, the calibration document image and the document image to be inspected may be different from each other. As another example, the image obtainment unit 201 may select the calibration document image from among a plurality of document images. The image obtainment unit 201 may select the calibration document image from among the plurality of document images with reference to print patterns. For example, a document image with a large random print pattern can be selected.

In the above-described embodiment, the calibration document image and the document image to be inspected each corresponds to an entirety of a printing sheet, and represent a print pattern relative to the entirety of the printing sheet. On the other hand, the calibration document image and the document image to be inspected may each correspond to a part of the printing sheet, and represent a print pattern relative to the part of the printing sheet. For example, printing on a medium may be performed based on a document image so that a blank region exists in the periphery of the print pattern at the time of printing. In this case, processing similar to that of the above-described embodiment can be performed by adding a blank region to the peripheries of the calibration document image and the document image to be inspected.

In the above-described embodiment, the reference image generation unit 203 generates a reference image by deforming a document image based on the deformation information in step S304. However, the method of generating the reference image is not limited to this method. For example, in a case when the color space of the document image is different from the color space of the read image, the reference image generation unit 203 may further perform color conversion processing with respect to the document image. Furthermore, the reference image generation unit 203 may give noise caused by printing and/or reading in generating the reference image. In addition, optional processing for bringing the document image close to the read image can be used to generate the reference image.

In the above-described embodiment, the reference image is equivalent to an image obtained by deforming the document image to be inspected in accordance with the deformation information, and by further applying deformation in accordance with the document region. Thereafter, the inspection target image is deformed in accordance with the reference image, and then compared with the reference image. However, it is not essential to perform such processing. For example, the reference image may be an image obtained by deforming the document image to be inspected in accordance with the deformation information (e.g., an image obtained by deforming the document image with the application of the transformation f). In this case, the inspection processing unit 204 may compare the reference image with the inspection target image as is, or may compare the reference image with the inspection target image after performing translational position alignment. Such translational position alignment can be performed based on correspondence between characteristic points (e.g., position alignment marks) on the reference image and the inspection target image. It should be noted that the inspection processing unit 204 may deform at least one of the inspection target image and the reference image and then compare them with each other, similar to the above-described embodiment.

Furthermore, although the transformation f from the read image to the document image is the quasi-affine transformation in the above-described embodiment, the type of the transformation f is not limited to this. Another deformation processing that can indicate a local displacement caused by printing and/or reading may be used as the transformation f. For example, deformation processing that uses, for example, B-spline interpolation based on associated coordinates of grid points, or nonlinear deformation processing, such as free-form deformation, may be used.

In step S603 of the above-described embodiment, the deformation information obtainment unit 202 calculates the coordinates of reference points on the read image using the transformation f 1 from the document image into the read image. The method of calculating the coordinates of reference points on the read image is not, however, limited to this method. For example, the deformation information obtainment unit 202 may obtain the coordinates in the read image that correspond to the vertices of a medium (printing sheet) as the coordinates of reference points on the read image. As a specific example, the deformation information obtainment unit 202 can calculate the coordinates corresponding to the vertices of the printing sheet through matching between a pre-prepared template image corresponding to the vertices of the printing sheet and the read image. Alternatively, the deformation information obtainment unit 202 may extract pixels that represent the outline of the printing sheet from the read image, and calculate the coordinates corresponding to the vertices of the printing sheet based on the positions of these pixels.

Furthermore, although the vertices of the printing sheet are used as the reference points in step S603, other points may be used as the reference points. For example, the locations that are displaced from the vertices of the printing sheet toward the inner side of the sheet by a predetermined distance may be used as the reference point.

Furthermore, although projective transformation is used as the transformation g from the reference image into the read image in the above-described embodiment, the type of the transformation g is not limited to this. For example, affine transformation based on correspondence between reference points on the reference image and the read image may be used as the transformation g, or nonlinear deformation processing such as free-form deformation may be used there as. The transformation g may be another uniform deformation of the entirety of the image.

Furthermore, although the inspection processing unit 204 deforms the inspection target image in accordance with the reference image using projective transformation in step S306 of the above-described embodiment, the deformation method is not limited to this method. For example, affine transformation based on correspondence between characteristic points on the reference image and the inspection target image may be used, or nonlinear deformation processing such as free-form deformation may be used. The inspection processing unit 204 can also perform another uniform deformation of the entirety of the image.

Furthermore, the inspection processing unit 204 may perform local position alignment with respect to the reference image and the inspection target image, and then compare them with each other. For example, when generating a difference image from the deformed inspection target image and the reference image, the inspection processing unit 204 may perform local position alignment with respect to the inspection target image and the reference image. As a specific example, the inspection processing unit 204 can search a region near a pixel in the reference image that corresponds to a target pixel in the inspection target image for a pixel with color information that exhibits the smallest difference from color information of the target pixel. In this case, the inspection processing unit 204 can generate the difference image so that the pixel corresponding to the target pixel has the color information difference between the target pixel and the pixel that has been searched for. With this configuration, a print product can be inspected with high accuracy even in a case when a local displacement caused by printing and/or reading varies with each read image. Meanwhile, this configuration, too, is expected to reduce a local displacement between the reference image and the inspection target image by using a reference image to which a local displacement has been added for an inspection purpose. Therefore, even if a search range used in the local position alignment is small, it is expected that the accuracy of the local position alignment increases, and the inspection accuracy or the inspection speed becomes high.

<Deformation Information for Region outside Printing>

In the above-described embodiment, the deformation information is indicated by correspondence between the calibration document image and the calibration read image, more specifically, the association between grid points on the read image and the document image. Then, transformation from the document image into the read image based on the transformation f can be performed by calculating the coordinates of points on the document image corresponding to points on the read image with use of the coordinates of grid points on the document image corresponding to nearby grid points on the read image. On the other hand, the transformation f from the document image into the read image outside a print region may be performed based on correspondence between the calibration document image and the calibration read image at a nearby area inside a print region.

The following description is provided in relation to a case when deformation information for the inside of a print region is indicated based on nearby correspondence between the calibration document image and the calibration read image, whereas deformation information for the outside of the print region is indicated based on nearby correspondence between the calibration document image and the calibration read image inside the print region. The print region mentioned here is a region in which a print pattern included in a document image has been printed by the printing apparatus 190. A region outside the print region is a region in which the print pattern included in the document image has not been printed. For example, it is a blank region. It should be noted that the region outside the print region may exist inside the print region.

In this case, in step S601, the deformation information obtainment unit 202 first obtains information indicating a print region of the calibration read image. Also, the deformation information obtainment unit 202 arranges grid points on the calibration read image, similar to the above-described embodiment. Here, the grid points are categorized as inprint-region grid points that are located inside the print region, or out-of-print-region grid points that are not located inside the print region. Note that, in the present example, it is assumed that the calibration read image includes a printing displacement whereby the position of the print pattern is displaced relative to the printing sheet.

Figure 11:
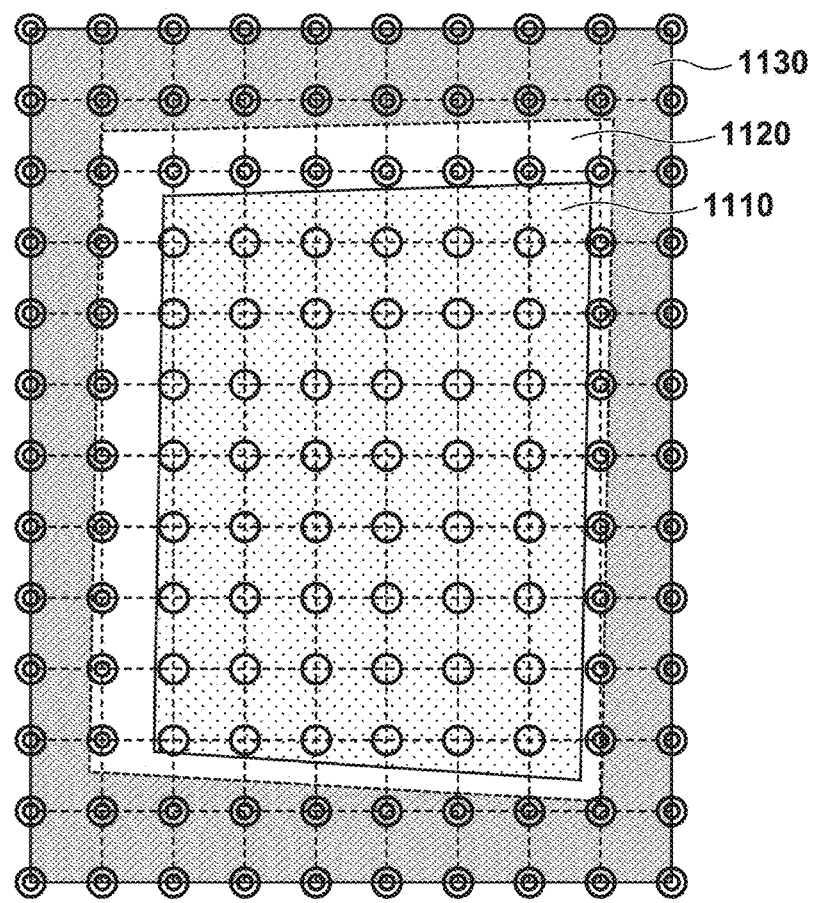
FIG. 11 is a diagram showing examples of in-print-region grid points and out-of-print-region grid points.

FIG. 11 shows examples of the in-print-region grid points and the out-of-print-region grid points. FIG. 11 shows a document region 1120, a print region 1110 inside the document region 1120, and a background region 1130 outside the document region 1120, with respect to a read image. Furthermore, the in-print-region grid points are indicated by circles (o), and the out-of-print-region grid points are indicated by double circles (@).

In order to obtain information that indicates the print region, the deformation information obtainment unit 202 can first determine the document region in the calibration read image. For example, the deformation information obtainment unit 202 can determine the document region by binarizing the calibration read image using a threshold that has been set to distinguish between the background region that does not show the printing sheet and the document region that shows the printing sheet. Furthermore, the deformation information obtainment unit 202 can detect the print region from within the document region. For example, the deformation information obtainment unit 202 can determine the print region that shows a print pattern by binarizing the calibration read image inside the document region using a threshold that has been set to distinguish between a portion that shows the printing sheet and a portion that shows the print pattern. On the other hand, the method of determining the print region is not limited to this method. The print region may be set in advance with respect to the calibration read image.

In step S602, the deformation information obtainment unit 202 associates the read image and the document image with each other inside the print region. The deformation information obtainment unit 202 can calculate points on the calibration document image that respectively correspond to the in-print-region grid points. Specifically, the deformation information obtainment unit 202 can determine the coordinates (x"g, y"g) on the calibration document image that respectively correspond to the coordinates (x'g, y'g) of the in-print-region grid points, similarly to the above-described embodiment.

Furthermore, the deformation information obtainment unit 202 associates the read image and the document image with each other outside the print region. The deformation information obtainment unit 202 can determine points on the calibration document image that respectively correspond to the out-of-print-region grid points. Specifically, the deformation information obtainment unit 202 associates each out-of-print-region grid point with the nearest in-print-region grid point. Then, using the coordinates of a point on the calibration document image that corresponds to the nearest in-print-region grid point, the deformation information obtainment unit 202 can calculate the coordinates of a point on the calibration document image that corresponds to the out-of-print-region grid point. This processing can be performed in accordance with, for example, expression (6).

$$x''_{g*} = x''_{gn} + \alpha(x'_{g*} - x'_{gn})$$
$$y''_{g*} = y''_{gn} + \alpha(y'_{g*} - y'_{gn})$$
(6)

In expression (6), $(x'_{g}*, y'_{g}*)$ denotes the coordinates of an out-of-print-region grid point, and $(x''_{g}*, y''_{g}*)$ denotes the coordinates on the calibration document image that correspond to this grid point. Also, $(X'_{gn}, y'_{gn})$ denotes the coordinates of the nearest in-print-region grid point, and $(x''_{gn}, y''_{gn})$ denotes the coordinates on the calibration document image that correspond to the nearest in-print-region grid point. Furthermore, a denotes the ratio between the resolutions of the read image and the document image.

Subsequent processing can be performed in a manner similar to the above-described embodiment. In this case, in accordance with the above-described association, deformation information such as the transformation f can be obtained that indicates a local displacement inside the print region based on the association between respective points on the calibration document image and corresponding points on the calibration read image inside the print region. On the other hand, this deformation information indicates a local displacement outside the print region based on the association between respective points on the calibration document image and corresponding points on the calibration read image inside the print region.

FIG. 12 shows an example of the association between a reference image and a calibration read image according to the present embodiment. In FIG. 12, reference points on a document image 1210 and reference points on a reference image 1230 are shown, similar to FIG. 9. The reference points c'0 c'1, c'2, and c'3 on the calibration read image 1220 are coordinates that correspond to the vertices of a printing sheet for a case when there is no printing displacement relative to a print region.

The association made between a calibration document image and a calibration read image using, for example, template matching in step S602 is easily affected by an overall printing displacement outside the print region where a pattern is not printed. Therefore, in a case when the calibration read image includes a printing displacement, there is a possibility that a local displacement caused by printing and/or reading is not easily determined outside the print region. Due to this modification example, as the association made between the read image and the document image outside the print region is based on the association made between the read image and the document image inside the print region, the effects of the printing displacement are suppressed. More specifically, the effects of the printing displacement on the association between grid points can be suppressed. Therefore, a print product can be inspected with high accuracy even in a case where the calibration read image includes a printing displacement.

<Generation of Reference Image in Conformity with Medium Size>

The description above has been provided in relation to a case when the medium size corresponding to the document image to be inspected is the same as the medium size corresponding to the calibration document image. Meanwhile, the medium size corresponding to the document image to be inspected may be different from the medium size corresponding to the calibration document image. The following describes a method of obtaining a transformation from a reference image into a read image in conformity with a medium size by associating the reference image and the read image with each other in accordance with a medium size corresponding to a document image. Below, a description is given of a case when a medium is a printing sheet, and the medium size will be referred to as a sheet size.

In the present example, the reference image generation unit 203 generates a reference image in conformity with the sheet size of a document image to be inspected. To this end, the deformation information obtainment unit 202 associates the reference image and the read image with each other in accordance with the sheet size.

Figure 13:
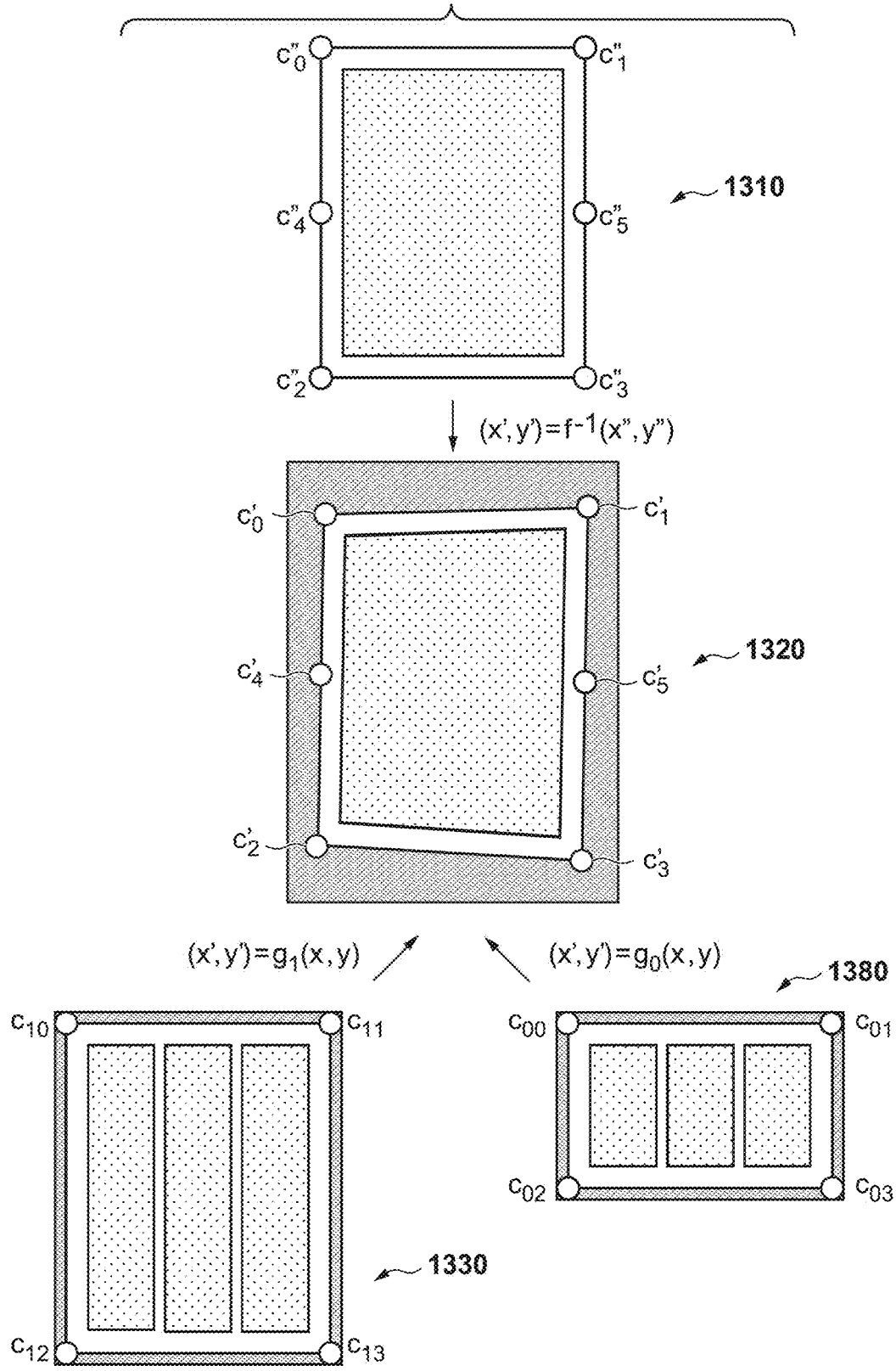
FIG. 13 is a diagram showing an overview of association between a reference image and a read image.

FIG. 13 shows an overview of the association between the reference image and the read image. In the present embodiment, the vertices of the printing sheet are used as reference points on the reference image, and the deformation information obtainment unit 202 associates reference points on the reference image with reference points on a calibration read image.

In the following description, a sheet size corresponding to a calibration document image 1310 is A3. Furthermore, a sheet size corresponding to a reference image is A4 or A3. The resolution and the background region size of the reference image are set in advance. In addition, the document region size of the reference image can be set so that it matches the sheet size. That is to say, the reference image can have a size that is in conformity with the medium size corresponding to the document image to be inspected.

FIG. 13 shows a reference image 1380 (A4 reference image) that corresponds to an A4 document image and is used in an inspection of an A4 print product. Reference points on the A4 reference image are c00, c01, c02, and c03. FIG. 13 also shows a reference image 1330 (A3 reference image) that corresponds to an A3 document image and is used in an inspection of an A3 print product. Reference points on the A3 reference image are c10, c11, c12, and c13. The coordinates of such reference points are calculated based on the sheet size, the resolution of the reference image, and the size of the background region.

The following description will be provided in relation to a case when the deformation information obtainment unit 202 associates reference points on the reference image with reference points on the calibration read image for each of the plurality of sheet sizes. Through the following processing, a transformation from the reference image into the read image can be obtained for each of the plurality of sheet sizes. In this case, processing of steps S603 to S605 is repeated for each of the plurality of sheet sizes. Meanwhile, the deformation information obtainment unit 202 does not need to calculate the transformation for each of the plurality of sheet sizes, and may calculate the transformation g for one sheet size.

In step S603, the deformation information obtainment unit 202 calculates the coordinates of the reference points on the calibration document image based on the target sheet size. In one embodiment, the reference image is generated based on a local displacement in a region which is included in the calibration document image and which has a size that substantially matches the print size corresponding to the document image to be inspected. For this reason, the deformation information obtainment unit 202 can calculate the coordinates of the reference points on the calibration document image so that the area of the region surrounded by the reference points is substantially the same between the reference image and the calibration document image. For example, as shown in FIG. 13, in order to obtain a transformation from the A3 reference image 1330 into the document image, c"0, c"1, c"2, and c"3 can be used as the reference points on the calibration document image 1310. Furthermore, in order to obtain a transformation from the A4 reference image 1380 into the document image, c"0, c"1, c"4, and c"5 can be used as the reference points on the calibration document image 1310. In the example of FIG. 13, the pixels at four corners of the calibration document image are c"0, c"1, c"2, and c"3. Furthermore, the midpoint between c"0 and c"2 is c"4, and the midpoint between c"1 and c"3 is c"5.

Then, from the coordinates of the reference points on the calibration document image, the deformation information obtainment unit 202 calculates the coordinates on the read image corresponding to the reference points based on the transformation f 1 from the document image into the read image. In the example of FIG. 13, in a case when the transformation from the A3 reference image 1330 into the document image is to be obtained, the reference points on the calibration read image 1320 are c'0, c'1, c'2, and c'3. Furthermore, in a case when the transformation from the A4 reference image 1380 into the document image is to be obtained, the reference points on the calibration read image 1320 are c'0, c'1, c'4, and c'5.

Finally, the deformation information obtainment unit 202 associates the reference points on the reference image with the reference points on the calibration read image. In order to obtain the transformation from the A3 reference image into the document image, the deformation information obtainment unit 202 associates the reference points c10, c11, c12, and c13 on the A3 reference image 1330 with the reference points c'0, c'1, c'2, and c'3 on the calibration read image 1320. Also, in order to obtain the transformation from the A4 reference image into the document image, the deformation information obtainment unit 202 associates the reference points c00, c01, c02, and c03 on the A4 reference image 1380 with the reference points c'0, c'1, c'4, and c'5 on the calibration read image 1320.

In step S604, with respect to the target sheet size, the deformation information obtainment unit 202 calculates the transformation from the reference image into the read image based on the association made between the reference points on the reference image and the read image in step S603. In the present embodiment, the deformation information obtainment unit 202 can obtain a transformation $g_1$, which corresponds to the A3 size and represents projective transformation, based on the association between c10, c11, c12, and c13 and c'0, c'1, c'2, and c'3. Furthermore, the deformation information obtainment unit 202 can obtain a transformation $g_0$, which corresponds to the A4 size and represents projective transformation, based on the association between c00, c01, c02, and c03 and c'0, c'1, c'4, and c'5. A specific method of calculating the transformation $g_0$ and the transformation $g_1$ are similar to the above-described method of calculating the transformation g.

In step S605, the deformation information obtainment unit 202 calculates a transformation h; from the reference image into the document image with respect to the target sheet size.

Figure 14A:
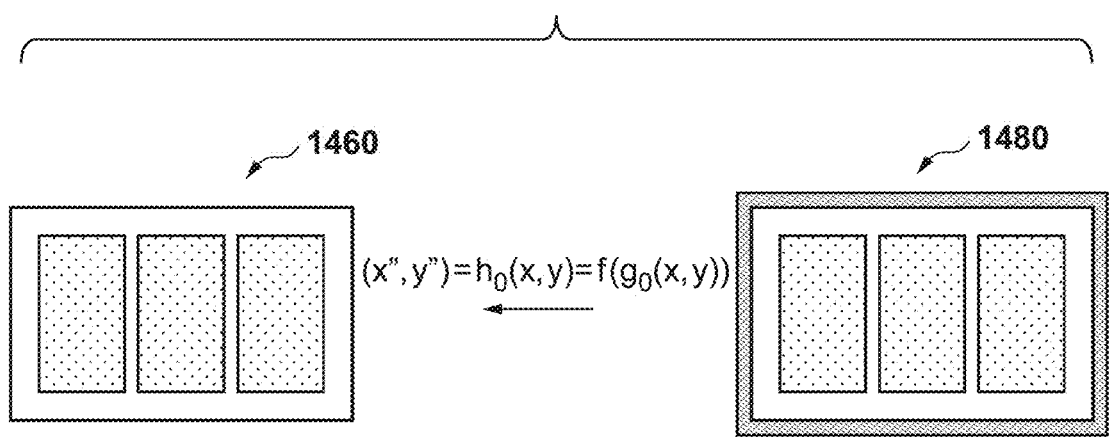
FIGS. 14A and 14B are diagrams showing an overview of a transformation from a reference image into a document image.
Figure 14B:
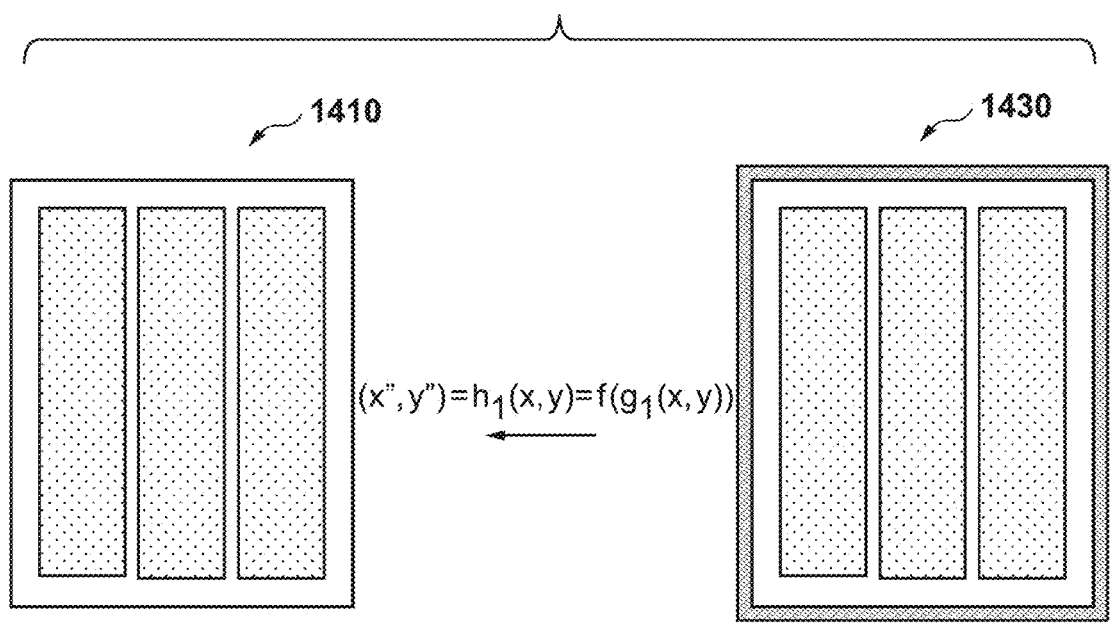

FIGS. 14A and 14B show an overview of the transformation from the reference image into the document image. The deformation information obtainment unit 202 calculates a transformation $h_0$ from an A4 reference image 1480 into a document image 1460 that corresponds to the A4 size, and calculates a transformation $h_1$ from an A3 reference image 1430 into a document image 1410 that corresponds to the A3 size. The transformation $h_1$ for calculating coordinates (x", y") on the document image from coordinates (x,y) on the reference image can be indicated by expression (7) based on the transformation f from the read image into the document image, and on the transformation $g_1$ from the reference image into the read image. Here, the deformation information obtainment unit 202 calculates the transformation $h_1$ using the transformation f and the transformation $g_1$ in a case where the target sheet size is A3, and calculates the transformation $h_0$ using the transformation f and the transformation $g_0$ in a case when the target sheet size is A4.

$$(x'', y'')=h_i(x,y)=f(g_i(x,y)) \ldots \quad (7)$$

Thereafter, the reference image generation unit 203 can generate the reference image corresponding to the sheet size of the document image to be inspected (e.g., the A3 reference image or the A4 reference image) using deformation information corresponding to the sheet size of the document image to be inspected and the document image to be inspected. A specific method of generating the reference image is similar to that of the above-described embodiment.

According to the foregoing modification example, the reference image and the read image are associated with each other in accordance with a sheet size corresponding to the document image to be inspected, and, consequently, deformation information corresponding to the sheet size can be obtained. With this configuration, a print product can be inspected with high accuracy even in a case when the sheet size corresponding to the calibration document image is different from the sheet size corresponding to the document image. Especially, by obtaining pieces of deformation information that respectively correspond to the plurality of sheet sizes, the inspection can be performed efficiently also in a case when print products to be inspected have a variety of sheet sizes.

Note that the method of calculating the coordinates of the reference points on the calibration document image is not limited to the above-described method. For example, the reference points on the calibration print image may be the vertices of the printing sheet. In this case, the coordinates of the reference points on the calibration document image that correspond to the reference points on the reference image may be decided on so that the positional relationships thereof match each other. In this case, the coordinates of the reference points c"0, c"1, c"4, and c"5 on the calibration document image corresponding to the A4 reference image are equal to the coordinates of the reference points c"0, c"1, c"2, and c"3 on the calibration document image corresponding to the A3 reference image. When this method is used, the sheet size corresponding to the document image to be inspected may be larger than the sheet size of the calibration document image.

Note that, if a local displacement included in the document image to be inspected resembles a local displacement that is included in the calibration read image and that is present in a region surrounded by the reference points corresponding to the sheet size of this document image, the accuracy of an inspection of a print product increases. From this viewpoint, the reference point on the calibration document image may be selected in consideration of a printing mechanism of the printing apparatus 190 and a reading mechanism of the image reading apparatus 105. For example, it is considered that the accuracy of an inspection of a print product increases as a result of deciding on the coordinates of the reference points on the calibration document image so that a straight line connecting two reference points on the calibration document image indicates the same scanning direction as a straight line connecting between two corresponding reference points on the reference image. As a specific example, the coordinates of the reference points on the calibration document image can be decided on so that c"0-c"1 also indicates the sub scanning direction in a case when coo-Con indicates the sub scanning direction. Similarly, the coordinates of the reference points on the calibration document image can be decided on so that c"0-c"1 also indicates the main scanning direction in a case where coo-Col indicates the main scanning direction.

Although the sheet size corresponding to the calibration document image is A3 and the sheet size corresponding to the reference image is A4 or A3 in the foregoing example, the sheet sizes are not limited to these. For example, the sheet size corresponding to the calibration document image may be another size, such as B3, and the sheet sizes corresponding to the reference image may include B5.

<Correction of Reference Image>

In a case when the frequency of occurrence of a defect in a specific region is high while an inspection is performed on an inspection target image in steps S305 to S307, the reference image may be corrected. Specifically, the reference image can be corrected based on deformation information that has been corrected based on the document image and the read image. Such a correction enables a print product to be inspected with high accuracy even in a case when a local displacement caused by printing and/or reading has changed on a specific location. This embodiment will be described below.

In this embodiment, after step S306, the inspection processing unit 204 determines a region in which the frequency of detection of a defect is high during an inspection of a print product. Specifically, the inspection processing unit 204 can generate a defect occurrence frequency map, which includes the frequencies of occurrence of defective pixels as pixel values, based on a defect map that has been generated with respect to a plurality of inspection target images in step S306. Based on this defect occurrence frequency map, the inspection processing unit 204 can determine a region in which the frequency of occurrence of a defect is higher than a predetermined threshold (a specific region).

In a case when the specific region has been detected, the reference image can be corrected. Specifically, the reference image generation unit 203 can correct the reference image with respect to the specific region. For this reason, the deformation information obtainment unit 202 can obtain correction information that indicates a local displacement in the specific region, and the reference image generation unit 203 can correct the reference image based on this correction information.

Specifically, first, the deformation information obtainment unit 202 corrects the transformation h from the reference image to the document image. In this embodiment, in order to correct the transformation h, the deformation information obtainment unit 202 associates the read image and the document image with each other in the specific region. In the present embodiment, this association is made using the inspection target image and the document image to be inspected. First, the deformation information obtainment unit 202 places grid points with respect to the inspection target image, similarly to step S601. Next, the deformation information obtainment unit 202 detects, from among the grid points that have been placed, grid points corresponding to the specific region (e.g., grid points included in the specific region, grid points located at the vertices of a rectangular region that is included among rectangular regions separated in a grid-like pattern and that overlaps the specific region, or the like). Note that, while the defect occurrence frequency map indicates the specific region within the reference image, a corresponding specific region within the inspection target image can be determined by using the transformation g from the reference image into the read image.

Furthermore, the deformation information obtainment unit 202 determines points on the document image to be inspected that correspond to the grid points corresponding to the specific region within the inspection target image. This processing can be performed using, for example, template matching in accordance with a method similar to that of step S601. In this way, the deformation information obtainment unit 202 can obtain the correction information that indicates a local displacement between the inspection target image and the inspection target in the specific region.

As described above, in step S601, the grid points on the read image are associated with the coordinates of corresponding points on the document image. In this embodiment, with regard to grid points corresponding to the specific region within the read image (inspection target image), the deformation information obtainment unit 202 updates the associated coordinates based on the coordinates of points on the document image to be inspected that correspond to these grid points. As described above, in this embodiment, the association between the read image and the document image is corrected in accordance with information that indicates a local displacement between the inspection target image and the inspection target in the specific region.

Then, the deformation information obtainment unit 202 calculates the transformation f, similarly to step S602, in accordance with the corrected association between the read image and the document image. At this time, with regard to grid points outside the specific region, the deformation information obtainment unit 202 can use information that indicates the association between grid points on the read image and the coordinates of corresponding points on the document image, which has been obtained in step S601. Furthermore, the deformation information obtainment unit 202 calculates the transformation h, similarly to step S605, using the calculated transformation f and transformation g. Note that the transformation g may be calculated again similarly to steps S603 and S604, or the transformation g that has been calculated in the past to calculate the transformation h may be used while skipping the calculation of the transformation g. In the following step S305, the reference image generation unit 203 can generate the reference image using the transformation h obtained in the foregoing manner and the document image to be inspected. In this way, the reference image generation unit 203 can generate the reference image, which is obtained by adding, to the document image to be inspected, a local displacement corresponding to the deformation information obtained in step S601 and the correction information obtained in the foregoing manner.

As described above, in this embodiment, the association between the read image and the document image, and the transformation f are corrected based on the association between the read image and the document image in the specific region, and the transformation h and the reference image are also corrected using the same. It is considered that the high frequency of occurrence of a defect in the specific region is affected by excessive detection attributed to the change in the mode of a local displacement caused by printing and/or reading in this specific region. According to the foregoing processing, the reference image is corrected so as to reflect the change in the local displacement caused by printing and/or reading. Consequently, a print product can be inspected with high accuracy even in a case when the local displacement has changed.

Note that, in another embodiment, in a case when the frequency of occurrence of a defect in the specific region is high, the image obtainment unit 201 may notify a user of the existence of the region with the high frequency of detection of a defect. For example, the image obtainment unit 201 can inform the user of a suggestion to re-obtain the deformation information and/or the reference image via the UI panel 108, and the like. In this case, processing shown in FIG. 3 may be performed again in accordance with a user operation, or the above-described processing for correcting the reference image may be performed.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., ua central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   one or more memories storing instructions; and
   one or more processors that execute the instructions:
   to obtain first information indicating a local displacement between a first document image and a first read image that is obtained by reading a print product based on the first document image;
   to generate a reference image, the reference image being obtained by adding the local displacement in accordance with the first information to a second document image; and
   to compare a second read image and the reference image with each other to perform an inspection of a print product based on the second document image, the second read image being obtained by reading the print product based on the second document image,
   wherein the reference image includes a document region obtained by adding local deformation in accordance with the first information to the second document image, and a blank region surrounding the document region, and
   an image inside the document region is an image obtained by adding the local deformation in accordance with the first information to the second document image and deforming a result of the addition in accordance with a shape of the document region.

2. The image processing apparatus according to claim 1, wherein the first information indicates an association between a target point on the first document image and a corresponding point on the first read image, so that an object located at the target point on the first document image matches an object located at the corresponding point on the first read image.

3. The image processing apparatus according to claim 1, wherein the first information indicates a relationship between coordinates of a point on the first document image included in one of a plurality of regions and coordinates of a corresponding point on the first read image, with parameter sets that are set respectively for the regions.

4. The image processing apparatus according to claim 1, wherein the first information indicates a relationship between coordinates of a point on the first document image and coordinates of a corresponding point on the first read image based on an association between a point located near the point on the first document image and a corresponding point on the first read image.

5. The image processing apparatus according to claim 1, wherein the one or more processors further execute the instructions to compare the second read image and the reference image with each other after at least one of the second read image and the reference image has been deformed to undergo position alignment with respect to an object on the second read image and an object on the reference image.

6. The image processing apparatus according to claim 5, wherein at least one of the second document image and the reference image is deformed through uniform transformation of an entirety of the image.

7. The image processing apparatus according to claim 1, wherein the one or more processors further execute the instructions to compare the reference image and the second read image with each other after performing local position alignment.

8. The image processing apparatus according to claim 1, wherein the shape of the document region corresponds to a shape of a printing medium on which printing based on the second document image is performed.

9. The image processing apparatus according to claim 1, wherein the first document image and the second document image are the same image.

10. The image processing apparatus according to claim 1, wherein the reference image has a size that is in conformity with a size of a medium corresponding to the second document image.

11. The image processing apparatus according to claim 10, wherein the one or more processors that execute the instructions to generate the reference image based on a local displacement related to a region that is included in the first document image and which has a size that substantially matches the size of the medium corresponding to the second document image.

12. The image processing apparatus according to claim 10, wherein a size of a medium corresponding to the first document image is different from the size of the medium corresponding to the second document image.

13. The image processing apparatus according to claim 1, wherein the one or more processors further execute the instructions to determine a region in which a frequency of detection of a defect is high during an inspection of the print product, and to correct the reference image with respect to the region in which the frequency of detection of the defect is high.

14. The image processing apparatus according to claim 13, wherein the one or more processors further execute the instructions to obtain second information indicating a local displacement in the region in which the frequency of detection of the defect is high, and to correct the reference image based on the second information.

15. The image processing apparatus according to claim 13, wherein the one or more processors further execute the instructions to obtain second information indicating a local displacement between the second document image and the second read image in the region in which the frequency of detection of the defect is high, and to generate a reference image, the reference image being obtained by adding the local displacements in accordance with the first information and the second information to the second document image.

16. The image processing apparatus according to claim 1, wherein the one or more processors further execute the instructions to determine a region in which a frequency of detection of a defect is high during an inspection of the print product, and to notify a user of the region in which the frequency of detection of the defect is high.

17. An image processing method comprising:
obtaining first information indicating a local displacement between a first document image and a first read image that is obtained by reading a print product based on the first document image;
generating a reference image, the reference image being obtained by adding the local displacement in accordance with the first information to a second document image; and
comparing a second read image and the reference image with each other to perform an inspection of a print product based on the second document image, the second read image being obtained by reading the print product based on the second document image,
wherein the reference image includes a document region obtained by adding local deformation in accordance with the first information to the second document image, and a blank region surrounding the document region, and
an image inside the document region is an image obtained by adding the local deformation in accordance with the first information to the second document image and deforming a result of the addition in accordance with a shape of the document region.

18. A non-transitory computer-readable medium storing a program executable by a computer to perform a method comprising:
obtaining first information indicating a local displacement between a first document image and a first read image that is obtained by reading a print product based on the first document image;
generating a reference image, the reference image being obtained by adding the local displacement in accordance with the first information to a second document image; and
comparing a second read image and the reference image with each other to perform an inspection of a print product based on the second document image, the second read image being obtained by reading the print product based on the second document image,
wherein the reference image includes a document region obtained by adding local deformation in accordance with the first information to the second document image, and a blank region surrounding the document region, and
an image inside the document region is an image obtained by adding the local deformation in accordance with the first information to the second document image and deforming a result of the addition in accordance with a shape of the document region.

19. An image processing apparatus comprising:
one or more memories storing instructions; and
one or more processors that execute the instructions:
to obtain first information indicating a local displacement between a first document image and a first read image that is obtained by reading a print product based on the first document image;
to generate a reference image, the reference image being obtained by adding the local displacement in accordance with the first information to a second document image; and
to compare a second read image and the reference image with each other to perform an inspection of a print product based on the second document image, the second read image being obtained by reading the print product based on the second document image, wherein the first information indicates a local displacement inside a print region based on association between points on the first document image and corresponding points on the first read image inside the print region, and indicates a local displacement outside the print region based on association between points on the first document image and corresponding points on the first read image inside the print region.

* * * * *